250/13784 XR 4,482,988
1201

United States Patent [19]
Tsurushima et al.

[11] Patent Number: 4,482,988
[45] Date of Patent: Nov. 13, 1984

[54] OBJECTIVE LENS MOUNT AND DRIVE FOR OPTICAL DISC PLAYER

[75] Inventors: Katsuaki Tsurushima, Kawasaki; Kenji Shintani, Tokyo, both of Japan

[73] Assignee: Sony Corporation, Tokyo, Japan

[21] Appl. No.: 579,800

[22] Filed: Feb. 17, 1984

Related U.S. Application Data

[63] Continuation of Ser. No. 336,551, Jan. 4, 1982, abandoned.

[30] Foreign Application Priority Data

Jan. 16, 1981 [JP] Japan .................................. 56-5783

[51] Int. Cl.[3] .......................... G11B 7/08; G11B 7/12

[52] U.S. Cl. ........................................ 369/45; 369/44; 250/201; 350/247; 350/255

[58] Field of Search .................................. 369/44–46, 369/100, 109–112, 32–33, 41; 250/201–202; 350/247, 255, 252, DIG. 1; 358/342

[56] References Cited

U.S. PATENT DOCUMENTS

| | | | |
|---|---|---|---|
| 3,992,576 | 11/1976 | Sugiura | 369/44 |
| 4,003,059 | 11/1977 | Sugiura et al. | 369/45 |
| 4,021,101 | 5/1977 | Camerik | 350/255 |
| 4,092,529 | 5/1978 | Aihara et al. | 250/201 |
| 4,135,083 | 1/1979 | Van Alem et al. | 250/201 |
| 4,135,206 | 1/1979 | Kleuters et al. | 369/44 |
| 4,193,091 | 3/1980 | Kleuters | 369/44 |
| 4,252,412 | 2/1981 | Camerik | 350/255 |
| 4,321,701 | 3/1982 | Arquie et al. | 369/45 |
| 4,367,543 | 1/1983 | Araki et al. | 369/45 |
| 4,386,823 | 1/1983 | Musha | 350/247 |

FOREIGN PATENT DOCUMENTS

| | | | |
|---|---|---|---|
| 53-129605 | 11/1978 | Japan | 369/112 |
| 55-117745 | 9/1980 | Japan . | |
| 56-119944 | 9/1981 | Japan | 369/45 |

OTHER PUBLICATIONS

Okada et al., "A New PCM Audio Disk Pickup Employing a Last Diode", J. of Audio E. S., vol. 28, No. 6, 6/80.

*Primary Examiner*—Raymond F. Cardillo, Jr.
*Attorney, Agent, or Firm*—Lewis H. Eslinger; Alvin Sinderbrand

[57] ABSTRACT

In an optical disc player or other apparatus in which a light beam is directed through an objective lens to be focused thereby at a record medium surface for optically reading information recorded in a track on such surface; the objective lens has its central axis offset in respect to the longitudinal axis of a cylindrical body forming part of a movable assembly and through which the light beam passes axially, and such cylindrical body is both angularly displaceable about its longitudinal axis and axially displaceable relative to a guide bearing forming part of a fixed assembly to correct for tracking errors and for focusing errors, respectively. The fixed assembly further includes a magnetic circuit generating a magnetic field which intersects coils included in the movable assembly to receive focusing error and tracking error signals, respectively.

8 Claims, 3 Drawing Figures

OBJECTIVE LENS MOUNT AND DRIVE FOR OPTICAL DISC PLAYER

This is a continuation of application Ser. No. 06/336,551, filed Jan. 4, 1982, now abandoned.

BACKGROUND OF THE INVENTION

1. Field of the Invention

This invention relates generally to an apparatus, such as an optical disc player, in which a light beam is directed against a disc or other record medium surface for optically reading information recorded in a track on such surface, and more particularly is directed to a device for movably supporting an objective lens in such apparatus.

2. Description of the Prior Art

It is known, for example, as disclosed in U.S. Pat. No. 4,135,083, to provide an optical disc player with a focusing servo by which the light beam from a laser light source is correctly focused on the disc surface through an objective lens, and also with a tracking servo by which the point of impingement of the focused light beam on the disc surface is made to coincide with the track being scanned or read. Further, in the above identified U.S. patent, and particularly in FIGS. 7–10 thereof, it is disclosed to support the objective lens by first and second sets of springs so that the objective lens can be moved, in response to electromagnetically applied forces, both in the axial direction for correcting the focusing errors, and in a direction extending radially in respect to the track being scanned for correcting tracking errors. However, the use of a number of springs to support the objective lens, as aforesaid, gives rise to problems, in that the interrelationships of the resonances of the several springs have to be considered. Furthermore, the mass of the movable member which includes the objective lens is relatively large. Therefore, in order for the movable member to have the proper kinetic characteristics for responding to tracking and focusing error signals, it is necessary for either the driving current or the number of coil turns in its associated electro-magnetic driving means to be relatively large.

It is also known to provide an apparatus of the described type with an objective lens which is mounted for movements to correct focusing and tracking errors without resort to mounting springs for permitting such movements. For example, as shown diagramatically on FIG. 1, in such known apparatus, a yoke plate 1 slidably supports a shaft 2 to permit both axial displacements of the shaft and angular displacements of the latter about its longitudinal axis. An objective lens is supported in a mount 3 which is carried by the free end of an arm 4 extending radially from shaft 2. A voice coil 5 is wound on a bobbin secured to the lower end of shaft 2 and intersects a magnetic field generated by a magnetic circuit which includes yoke plate 1 and an annular magnet 7 secured thereto. When a focusing error signal is applied to coil 5, shaft 2 is displaced axially to similarly move objective lens mount 3. Another coil 8 is mounted on the upper portion of shaft 2 and cooperates with a magnetic circuit including an additional magnet 9 so that, when a tracking error signal is supplied to coil 8, shaft 2 is angularly displaced about its longitudinal axis to correspondingly angularly displace arm 4 and thereby move objective lens mount 3 in an arcuate path which is generally normal to the paper in FIG. 1. As is usual, in the apparatus of FIG. 1, a laser light source S generates a light beam L reflected by a beam splitter or semi-reflecting mirror M so as to travel along a path which is normal to the surface of an optical record disc R and in which the objective lens in mount 3 is interposed for focusing the light beam substantially at the surface of disc R. The focused light beam, upon being reflected from the surface of disc R is returned through the objective lens and now passes through beam splitter M so as to impinge on a photo-sensitive detector or transducer T. The reflected light beam is, of course, modulated by an information signal recorded in a track on the surface of disc R and which is scanned by the focused light beam so that the output of transducer T is similarly modulated to reproduce or playback the recorded signal. Since the axis of shaft 2 is normal to the surface of disc R, axially displacements of shaft 2, as indicated by the arrow a, in response to the supplying of current to coil 5, move the objective lens in mount 3 toward and away from the record disc surface for varying the focus of the light beam. Further, the discretion of arm 4 is selected to be substantially tangential in respect to substantially circular tracks in which the information signals are recorded on the surface of disc R. Therefore, angular displacements of shaft 2, as indicated by the arrow b, in response to the supplying of a tracking error signal to coil 8 cause the objective lens in mount 3 to move substantially transversely in respect to the track being scanned for correcting a tracking error.

However, the known arrangement described above with reference to FIG. 1 is disadvantageous in that it is inherently large and massive, as well as being complicated to produce and assemble.

OBJECTS AND SUMMARY OF THE INVENTION

Accordingly, it is an object of the present invention to provide an apparatus in which a light beam is directed against a record medium surface for optically reading information recorded in a track on such surface, which apparatus is free of the previously mentioned disadvantages of the prior art.

More specifically, it is an object of this invention to provide an optical disc player with an improved mounting for its objective lens by which the latter can be desirably employed for correcting focusing and tracking errors.

Another object is to provide an improved mounting for an objective lens in an optical disc player, as aforesaid, and which is relatively simple in construction and reliable in operation.

In accordance with an aspect of this invention, in an apparatus directing a light beam against a record medium surface for optically reading information recorded in a track on such surface, there are a movable member including lens means interposed in the path of the light beam and having a central axis parallel with the direction of the passage of the light beam therethrough, lens support means extending outwardly from the lens means, coil means attached to the lens support means, and a cylindrical body fixed to the lens support means and having the path of the light beam extending longitudinally therethrough, with the longitudinal axis of the cylindrical body and the central axis of the lens means being offset laterally in respect to each other; and a fixed member including bearing means engaging around the cylindrical body and guiding the latter for at least angular displacements of the movable member about the longitudinal axis of the cylindrical body, and magnetic circuit means for generating a magnetic field intersecting the coil means so that angular displacements of the movable member are effected in response to supplying of a driving current to the coil means. It will be appreciated that, when the relative offset of the longitudinal axis of the cylindrical body and the central axis of the lens means is in a direction which corresponds to a direction along the track on the record medium surface, the angular displacements of the movable member about the longitudinal axis of its cylindrical body are effective to correct for tracking errors.

In a preferred embodiment of the invention, the bearing means engaging around the cylindrical body further guides the latter for displacements of the movable member in the direction of the longitudinal axis of the cylindrical body, and second coil means are attached to the lens support means and located within the same magnetic field as the first mentioned coil means so that supplying of a driving current to the second coil means is effective to cause displacements of the movable member in the direction of the longitudinal axis of the cylindrical body for correcting focusing errors.

The above, and other objects, features and advantages of the invention, will be apparent in the following detailed description of an illustrative embodiment of the invention which is to be read in connection with the accompanying drawings, wherein the same reference numerals are employed in the various views to identify corresponding parts.

DESCRIPTION OF A PREFERRED EMBODIMENT

Figure 1:
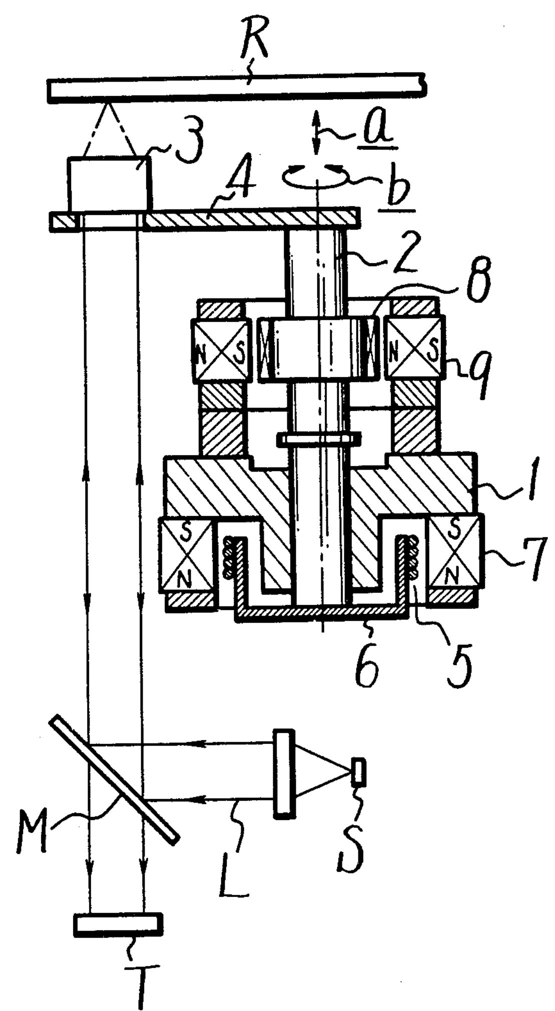
FIG. 1 is a diagrammatic sectional view showing the essential parts of the earlier described optical disc player according to the prior art.
Figure 2A:
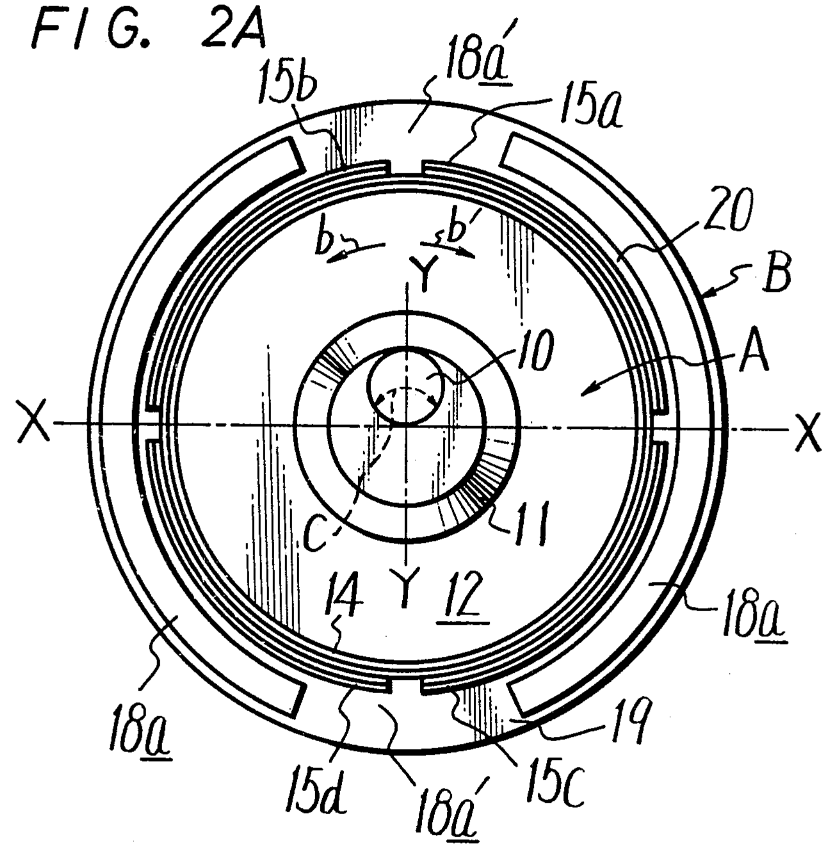
FIG. 2A is a top plan view of an objective lens mount and drive for an optical disc player in accordance with an embodiment of the present invention.
Figure 2B:
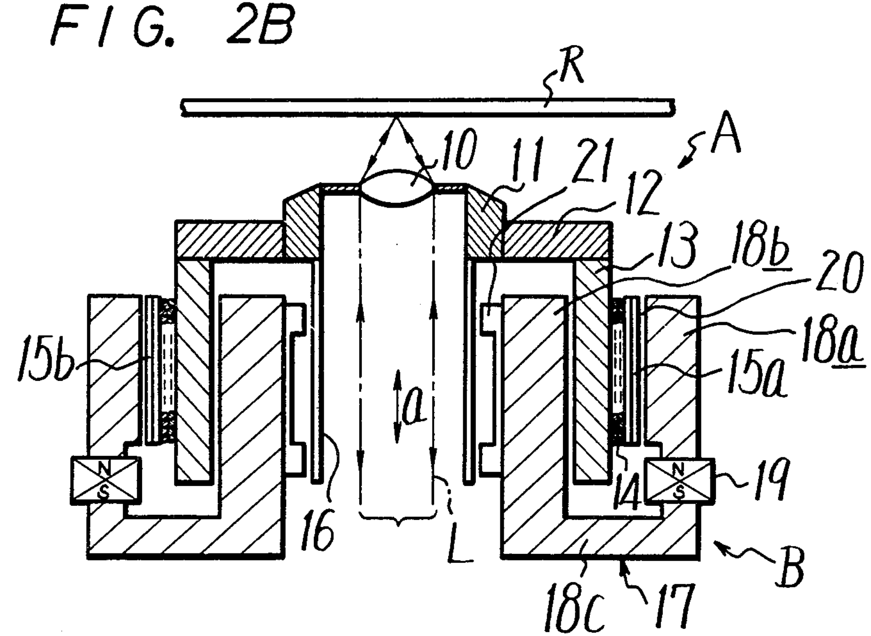
FIG. 2B is a sectional view taken along the line X—X on FIG. 2A.

Referring now to FIGS. 2A and 2B, it will be seen that, in an optical disc player or other apparatus according to an embodiment of this invention in which a light beam L is directed against a surface of a record medium R for optically reading information recorded in a track on such surface, an objective lens 10 is interposed in the path of the light beam L with the central or optical axis of such lens being generally parallel with the direction of the passage of the light beam therethrough.

The objective lens 10 forms part of a movable member A in which an annular lens mount 11 is secured to the periphery of lens 10 and has a radially outward directed flange 12 extending therefrom. A cylindrical bobbin 13 extends axially from the outer periphery of flange 12. A coil 14 is wound circumferentially around the outer surface of bobbin 13, and additional coils **15*a*, 15*b*, 15*c* and 15*d* are also suitably mounted on bobbin 13, for example, in overlying relation to coil 14. Each of the coils 15*a*–15*d* is wound so as to be rectangular in shape with straight end portions extending axially on bobbin 13 and curving top and bottom portions extending circumferentially over approximately one-quarter of the circumferential extent of the bobbin. Coils 15*a*, 15*b*, 15*c* and 15*d* are suitably connected to each other so that, when a signal for causing angular displacements of movable member A, for example, a tracking error signal, is applied thereto from a suitable circuit (not shown), such signal causes current flows in the same direction, that is, either up or down, through the axially extending adjacent end portions of coils 15*a* and 15*c* and of coils 15*b* and 15*d***, respectively.

The movable member or assembly A is completed by cylindrical body 16 which extends axially from lens mount 11 coaxially with bobbin 13 and is open ended so that the path of light beam L can extend longitudinally through cylindrical body 16 in passing through objective lens 10.

In accordance with the present invention, the central axis of objective lens 10 is parallel with the longitudinal axis of cylindrical body 16 and offset laterally from such longitudinal axis, as is clearly apparent on FIG. 2A. Further, in accordance with this invention, lens 10, mount 11, flange 12, bobbin 13 with coils 14 and **15*a*–15*d* thereon, and cylindrical body 16, all of which form movable member or assembly A, are mounted for angular displacements, as a unit, about the longitudinal axis of cylindrical body 16, and also for axial displacements in the direction of the longitudinal axis of body 16**, for example, for effecting tracking error corrections and focusing error corrections, respectively, as hereinafter described in detail.

More particularly, it will be seen that a fixed member or assembly B of the apparatus shown on FIGS. 2A and 2B desirably comprises a magnetic circuit 17 which includes an outer cylindrical or annular yoke **18*a*, an inner cylindrical or annular yoke 18*b* spaced radially inward from outer yoke 18*a*, an annular yoke connection 18*c* extending between the lower ends of yokes 18*a* and 18*b*, and an annular magnet 19 interposed in outer yoke 18*a* and being polarized so as to have opposite poles at its upper and lower surfaces. As shown on FIG. 2A, the outer yoke 18*a* has diametrically opposed cutout portions 18'*a* so that there will be substantially no magnetic flux or field extending between yokes 18*a* and 18*b* in the regions of the cutout portions 18'*a*, whereas there will be substantially uniform magnetic flux otherwise extending across the upwardly opening gap 20 between the remaining portions of outer yoke 18*a* and inner yoke 18*b***.

The fixed member or assembly B of the illustrated apparatus according to this invention is completed by a bearing 21 arranged inside inner yoke **18*b* and adapted to slidable extend around cylindrical body 16 of movable member A so as to guide the latter for longitudinal displacements in the direction of the longitudinal axis of body 16 and for angular displacements about such longitudinal axis in respect to the fixed member or assembly B while bobbin 13 with coils 14 and 15*a*–15*d* thereon extends axially from above into gap 20**.

As will be noted on FIG. 2A, the movable member or assembly is disposed so that the axially extending, adjacent end portions of coils **15*a* and 15*b* and the axially extending adjacent end portions of coils 15*c* and 15*d* will be disposed in the regions of the cutout portions 18'*a* in outer yoke 18*a*, that is, in regions where there is a substantial lack of a magnetic field due to permanent magnet 19. Thus, when a current is supplied to coils 15*a*–15*d* so as to cause flow through the adjacent end portions of coils 15*a* and 15*c* and through the adjacent end portions of coils 15*b* and 15*d* in one axial direction, for example, upwardly, such current flow interacts with the magnetic flux extending between yokes 18*a* and 18*b* to cause angular displacement of movable member A relative to fixed member B about the longitudinal axis of cylindrical body 16, for example, in the direction of the arrow b on FIG. 2A. Since the adjacent end portions of coils 15***a* and 15*b* and the adjacent end portions of coils 15*c* and 15*d* are located in the regions of the cutouts 18'*a*, and thus are not intersected by a magnetic field, the current flows through the last mentioned adjacent ends of coils 15*a* and 15*b* and of coils 15*c* and 15*d* do not give rise to forces resisting the angular displacement in the direction of the arrow b. On the other hand, when the current supply to coils 15*a*–15*d* causes current flow through the adjacent end portions of coils 15*a* and 15*c* and through the adjacent end portions of coils 15*b* and 15*d* axially in the downward direction, the interaction of such current flows with the magnetic field across gap 20 results in angular displacement of movable member A in the opposite direction, for example, in the direction of the arrow b' on FIG. 2A.

Since the central or optical axis of lens 10 is offset from the longitudinal axis of bobbin 13 and cylindrical body 16 in the apparatus according to the present invention, the angular displacements of movable member A relative to fixed member B are effective to move the optical or central axis of lens 10 in the directions indicated by the double-headed arrow c shown in broken lines on FIG. 2A. Thus, if the direction in which the central or optical axis of lens 10 is offset from the longitudinal axis of cylindrical body 16 and bobbin 13 is arranged to be substantially tangential to the track being scanned on the record disc R, then the displacements of the central or optical axis of lens 10 in the directions indicated at c and resulting from angular displacements of movable member A will be substantially in the radial direction of the record disc R, that is, transversely in respect to a track being scanned. Accordingly, if a tracking error signal is supplied to coils 15*a*, 15*b*, 15*c* and 15*d* in correspondence to a deviation of the point of impingement of light beam L on record disc R from a desired track being scanned, the resulting angular displacement of movable member A, and the corresponding displacement of lens 10 substantially in the radial direction of the record disc R can return the point of impingement of the light beam to the track being scanned so that a tracking servo is realized.

Although the locus of the movements of the central or optical axis of lens 10 is arcuate, as indicated by the arrow c, the distances through which the axis of lens 10 are moved in the direction of the axis X—X on FIG. 2A for correcting tracking errors are small so that the consequent movements of the axis of lens 10 in the direction of the axis Y—Y on FIG. 2A are insignificant. Therefore, the time base errors that would result from displacements of the axis of lens 10 in the direction of the axis Y—Y can be neglected.

It will also be seen that, in the apparatus according to the invention, the supplying of a current to coil 14 causes movable member A to be displaced in the direction of the longitudinal axis of cylindrical body 16, as indicated by the double-headed arrow a on FIG. 2B, in dependence upon the magnitude and direction of the current supplied to coil 14. Thus, a focusing error signal may be suitably supplied to coil 14 in response to deviation of light beam L from a sharply focused condition at the surface of record disc R, whereupon the resulting displacement of movable member A in the direction either toward or away from record disc R will restore the sharply focused condition.

It will be apparent from the foregoing, that the apparatus according to this invention can be employed for simultaneously correcting both focusing and tracking errors. In such apparatus, the coils 14 and 15*a*–15*d* for effecting the displacements of objective lens 10 in the directions required for focusing correction and for tracking correction, respectively, are mounted on the same bobbin 13 and are influenced by the same magnetic field resulting from the single permanent magnet 19. Thus, the apparatus according to the present invention is relatively simple and can be compactly arranged.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. In an apparatus directing a light beam against a record medium surface for optically reading information recorded in a track on such surface; the combination of a movable member including lens means interposed in the path of said light beam and having a central axis parallel with the direction of the passage of the light beam therethrough, lens support means extending outwardly from said lens means, first and second coil means attached to said lens support means, said first coil means including substantially rectangular-shaped coils and said second coil means being circumferentially wound and having said rectangular-shaped coils in stratified relation thereto, and a first bearing member fixed to said lens support means with a longitudinal axis of said first bearing member being offset laterally in respect to said central axis of said lens means; and a fixed member including a second bearing member engaging said first bearing member and guiding the latter for angular displacements of said movable member about said longitudinal axis of the first bearing member and for slidable displacements in the direction of said longitudinal axis and means constituting a single magnetic circuit for generating a magnetic field intersecting said first coil means except at one side of each of said rectangular-shaped coils so that said angular displacements of the movable member are affected in response to supplying of a first driving current to said first coil means, said magnetic field also intersecting said second coil means so that said slidable displacements of the movable member are effected in response to supplying of a second driving current to said second coil means.

2. An apparatus according to claim 1; in which said offset of the longitudinal axis of said first bearing member in respect to said central axis of the lens means is in a direction which corresponds to a direction along said track on the record medium surface so that said angular displacements are effective to correct for tracking errors.

3. An apparatus according to claim 2; in which said lens means is operative to focus said light beam substantially at said record medium surface, and said bearing means further guides said cylindrical body for displacements of said movable member in the direction of said longitudinal axis; and further comprising second coil means also attached to said lens support means and located within said magnetic field so that supplying of a second driving current supplied to said second coil means is effective to cause said displacements of said movable member in said direction of the longitudinal axis for correcting focusing errors.

4. An apparatus according to claim 3; in which said record medium is in the form of a disc which is rotated about the center thereof, said track is substantially circular and concentric with said disc, said lens means has said center axis thereof substantially normal to said surface so that said displacements in the direction of the longitudinal axis vary the focus of said light beam at said surface, and said offset is in a direction tangential to said circular track so that said angular displacements are effective to vary the point of impingement of the light beam on said surface substantially in the direction transverse to said track.

5. An apparatus according to claim 1; in which said means constituting a single magnetic circuit includes a ring-shaped magnet, an outer annular yoke extending from said magnet and an inner annular yoke extending from said magnet and being spaced radially inward from said outer yoke to define a gap therebetween, one of said outer and inner yokes has a cutout therein, an effective portion of said first coil means is disposed on said lens support means in said gap, and said second coil means is also disposed on said lens support means in said gap.

6. An apparatus according to claim 5; in which said gap opens axially at one end, and said lens support means includes a cylindrical bobbin extending axially into said gap at said one end and having said first and second coil means mounted thereon.

7. An apparatus according to claim 6; in which said cutout includes diametrically opposed portions, and said rectangular-shaped coils are arranged around said bobbin with end portions of such coils extending axially in respect to said bobbin and with one of said end portions of each coil being proximate to a respective one of said cutout portions.

8. An apparatus according to claim 7; in which said ring-shaped magnet has opposite poles facing axially in opposite directions.

* * * * *